(12) United States Patent
Zimmer

(10) Patent No.: US 6,706,302 B1
(45) Date of Patent: Mar. 16, 2004

(54) APPARATUS AND METHOD FOR TREATMENT OF FLUENT FOOD PRODUCTS

(75) Inventor: Artur G. Zimmer, 1118 Proud Foot Pl., Columbia, MD (US) 21044

(73) Assignee: Artur G. Zimmer, Columbia, MD (US)

( * ) Notice: Subject to any disclaimer, the term of this patent is extended or adjusted under 35 U.S.C. 154(b) by 0 days.

(21) Appl. No.: 09/556,305

(22) Filed: Apr. 24, 2000

Related U.S. Application Data (62) Division of application No. 09/273,713, filed on Mar. 22, 1999, now Pat. No. 6,168,141.

(51) Int. Cl.⁷ .................................................. A23C 9/00
(52) U.S. Cl. ........................ 426/476; 426/511; 426/522; 426/588
(58) Field of Search ................................. 426/520, 521, 426/522, 510, 511, 588, 471, 476

(56) References Cited

U.S. PATENT DOCUMENTS

| | | | | |
|---|---|---|---|---|
| 3,985,901 A | * | 10/1976 | Barberan | 426/588 |
| 4,369,198 A | * | 1/1983 | Uchi et al. | 426/521 |
| 5,906,847 A | * | 5/1999 | Engel et al. | 426/588 |

* cited by examiner

Primary Examiner—George C. Yeung
(74) Attorney, Agent, or Firm—W. Warren Taltavull; Manelli Denison & Selter PLLC (57) ABSTRACT

An apparatus and method of the heat treatment of a fluent food product with steam includes a pressure vessel having a steam inlet at one end and an a product outlet at the opposite end; an inner partition wall having an open end defines the product introduction and treatment chamber and includes a fluid distribution device adapted to provide a plurality of discrete turbulent sprays that impact in a turbulent manner on the interior surface of the partition wall to then flow downwardly to the open end in a turbulent manner while steam flow upwardly toward a vent located at the top of the treatment chamber; balanced flow of steam is effected by apertured baffles extending between the interior wall of the vessel and the partition wall.

11 Claims, 6 Drawing Sheets

APPARATUS AND METHOD FOR TREATMENT OF FLUENT FOOD PRODUCTS

This is a divisional National Application Ser. No. 09/273,713 filed Mar. 22, 1999 now U.S. Pat. No. 6,168,141.

FIELD OF THE INVENTION

The present invention relates to an apparatus for heat treatment of liquid food products to reduce the bacterial count in the product without materially affecting the organoleptic qualities of the product and to a method for carrying out the treatment in an efficient manner. Additionally, the invention relates to a method for the high heat treatment of milk products for the purpose of denaturing the protein content of the milk.

BACKGROUND OF THE INVENTION

For many years, workers in the food industry have endeavored to increase the shelf life of a variety of food products while assuring the safety of the products for human consumption. Various sterilization techniques have been employed in the food industry to this end. Of these, the most popular has been heat sterilization particularly in conjunction with treatment of fluent products. In this regard, the maintenance of aseptic conditions guaranteeing the success of the sterilization process as well as control of other process parameters have been important to assure the effectiveness of the sterilization. For some types of food products, such as milk, careful handling of the product throughout the processing is mandatory not only for health reasons but also for the preservation of the desirable taste and other organoleptic properties of the product. These requirements have long been a significant cost factor in the marketing of the product.

In connection with denaturing the protein in milk products, that is, reduction of the Whey Protein Nitrogen Index (WPNI), high temperatures have been necessary in order to reduce the holding time and to allow greater flexibility in meeting differing product specifications such as for milk powder. It is desirable that the heat treatment be effected with minimal changes in color, taste and without production of burnt particles.

To achieve denaturing of the protein for the production of high heat milk powder (WPNI<1.5), in the past, cumbersome and expensive equipment has been employed and which required that the fluid milk product be maintained at approximately 80° C. for approximately 30 minutes. More recent developments have used temperatures up to 120° C. for much shorter holding intervals on the order of two minutes. However, even at these higher temperatures and shorter holding times, problems persist in terms of burn-on on the process equipment surfaces resulting in shorter operating cycles and lower quality products. Also, more frequent cleaning cycles are required.

The use of high temperatures has been limited by the unavailability of suitable heaters that could correlate with the volume capacity of other downstream equipment such as evaporators and dryers which now operate at capacities of 100,000 kg/hr or more of milk feed. One manufacturer has developed a fluid distribution head for milk sterilization that allows higher flow rates and as a result higher temperatures can be used such as on the order of 143°C. This translates into a shorter holding time of less than 30 seconds for the same degree of denaturation as previously attained at lower temperatures noted above. Also, at or about 143° C., the bacterial killing rate is the same as for ultra high temperature and extended shelf life products and will improve the shelf life of the powdered milk product.

Ultra high heat (UHT) and extended shelf life (ESL) products require a bacterial killing rate that can be accomplished for low heat milk powders (WPNI . 6.0) by using the same high sterilizing temperatures (143° C.) but it is necessary that the holding times be shorter such as on the order of 2 to 6 seconds.

Representative of the prior art are U.S. Pat. Nos. 4,310,476, Reissue 32,695, 4,591,463 and 5,544,571.

It has been found of particular importance that a fluent food product in conjunction with treatment with the sterilizing medium be handled in a manner that assures intimate contact on a molecular level between the medium such as steam and the fluent food product. As is well known, a milk product exhibits particular sensitivity to sterilization techniques. Even small temperature and other process variations during the treatment of milk can result in large changes in the taste of the product which risks rendering the product unacceptable to consumers. Moreover, marketing unsterilized milk establishes a price floor against which sterilized milk must compete. As a result, workers in this field have endeavored to provide a cost competitive technique for sterilizing milk and other fluent food products. However, while the theory of heat treatment of such products has been well tested, efficient production techniques have not been provided nor have apparatus and methods been developed that can effectively render a high quality sterilized product competitive in the market place with low temperature pasteurized liquid products.

SUMMARY OF THE INVENTION

In the invention, a pressure vessel is provided that has a longitudinal axis that, in use, is vertically oriented. At or near the top of the vessel, a fluid distribution device is removably mounted so as to extend into the vessel into a primary treatment zone that is defined by an inner partition wall that is open at a lower end thereof that is spaced above the bottom end of the pressure vessel. One or more steam inlets are located adjacent the upper end of the vessel so as to introduce sterilizing steam into the space between the wall of the pressure vessel and the outer surface of the partition wall that encloses the primary treatment zone. The fluid distribution device is preferably a hollow body or housing that is substantially cylindrical with an array of nozzles mounted in staggered positions about the surface of the housing. The nozzles are designed to distribute fluid introduced into the housing from a source under relatively high pressure in the from of triangularly shaped, flat sprays that are projected downwardly toward the partition wall at a selected angle of from about 45 to 600. Each spray pattern is regulated by the pressure and the nozzle design to contact the partition wall without any significant contact between adjacent spray patterns. The ejection under pressure of the fluent material from each nozzle induces turbulence which, on contact with the partition wall, continues as turbulent flow of the material downwardly to the bottom edge of the partition wall toward the material outlet at the bottom of the pressure vessel. The combination and sequence of high turbulence jet spray, impact on a wall and forced falling film flow down that same wall is employed to maintain turbulence in the flow during the entire heating process and prevent formation of a liquid stream or film which allows temperature differences to exist between a hotter surface of the stream and cooler core. The heating process is completed as the product leaves the product chamber typically less than one second after entering it.

According to the method of this invention, the fluent material to be treated is fed under pressure to the distribution device. From the nozzles of the distribution device, a plurality of distinct angularly defined flat sprays that do not significantly impinge on one another are projected across and at an angle to the flow of a sterilizing medium. The fluent material is then impacted on the partition wall and flows downwardly in counter flow relation to the rising sterilizing medium. A fraction of the sterilizing medium is vented from the upper portion of the pressure vessel to effect removal of non-condensable gases that are desorbed from the fluent material and from the condensing steam.

The apparatus and process of the invention will provide a gentle but highly efficient heat treatment of the fluent material at high production rates while allowing production costs to be reduced. This is due in part to the reduced physical size and the ease of maintenance of the apparatus as compared to prior art devices used for the same purpose. Moreover, the apparatus will ensure turbulence in the movement of the fluent material from emission from the nozzles to removal from the pressure vessel. This will significantly improve heat transfer along with the counter flow motion of the heating medium and the fluent material being treated and will allow the reduction in size of the apparatus while permitting significant improvement in production capacity.

The foregoing and other advantages of the invention will become apparent as consideration is given to the following detailed description taken in conjunction with the accompanying drawings, in which:

BRIEF DESCRIPTION OF THE DRAWINGS

FIG. 1 is a sectional view in elevation of the pressure vessel and fluent distribution device;

FIG. 2 is view along lines 2—2 of FIG. 1;

FIG. 3. is plan view along lines 3—3 of FIG. 1;

FIG. 4 is an enlarged view in elevation of the fluent distribution device;

FIG. 5 is a schematic view in sectional elevation of a nozzle mounted in the fluent distribution device;

FIG. 6 is top plan view of a portion of the fluent spray pattern used in the present invention. The dashed lines represent the projection of the triangular patterns on a certain plane with the dash dot dash lines representing the triangular patterns on the planes below and above thereby displaying the staggered overlap of the patterns;

FIG. 7 is schematic, elevational view of portions of the steam system and pipe supply system for food products and cleaning in place (CIP) solutions;

FIG. 8 is top plan view of the systems of FIG. 7; and

FIG. 9 is a detailed view of part of the steam balancing baffle.

FIG. 10 is a schematic illustration of a flow path of the milk product through a series of evaporators to a dryer to manufacture powdered milk product with the sterilizer of the present invention.

DETAILED DESCRIPTION OF THE INVENTION

Referring to the drawings, there is shown in FIG. 1 a sectional view of a pressure vessel generally designated at 10. The vessel is provided with a top wall 11 provided with an opening 12 through which a fluent distribution device 14 can be mounted to extend along the longitudinal axis 18 of the vessel 10. Typically, the vessel will have a side wall 16 which is covered with an insulation jacket. At its lower end, the vessel 10 is provided with a fluent material outlet 20 extending along the axis 18 and located at the apex of conical wall 21 surrounding the axis 18. The conical wall 21 may be enclosed in a cooling jacket 22 over at least a major portion of its surface area.

A pair of inlets 24*a* and 24*b* for a sterilizing medium such as steam is provided adjacent the upper end or top wall 11. The inlets may be in the shown form of cylindrical tubes having slot openings 25 spaced about the wall of each tube in a pattern that avoids direct impact of the steam on to the conical upper portion 33 of the product treatment chamber 31.

In this arrangement, extending from a support ring or the periphery 26 of top wall 11 is a partition wall 30 shaped to surround the axis 18 and which is of a radial dimension to be located radially inwardly of the interior surface of wall 16 of the vessel 10. The partition wall 30 defines a product treatment chamber 31 as described below. With this arrangement as shown in FIG. 1, the flow of steam will proceed downwardly in the space provided between the wall 16 of the vessel 10 and the outer surface of the partition wall 30. One or more balancing baffles may be provided on the interior surface of vessel 16 as at 19. As for clearly shown in FIG. 9, the baffles, which completely cover the annular space formed by wall 16 and wall 30 about the axis 18 of the vessel 10, are provided with a plurality of perforations 21. With this construction, the baffles will serve to distribute and balance the turbulent steam flow. The baffles 19 may be perforated with different numbers of and sizes of holes to achieve this.

As is well understood in this technology, the outer surface of the pressure vessel 10 may be covered by an insulation layer to reduce energy loss and to protect the operators.

The partition wall 30 is preferably in the form of an open ended tube having a substantially cylindrical middle portion 32, moderately conical upper portion 33 which is closed by top wall 11 and which will be provided with an opening for receiving the fluent distribution device 14, described in more detail below. In the lower end portion of the partition wall 30, a conically shaped wall section 36 is located which terminates at a lower edge 40 located not lower than the level where wall 16 of the vessel 10 and conical wall 21 of the vessel are connected. As shown in FIGS. 1 and 3, interiorly of section 36, flow controlling baffles 42 may be provided evenly spaced about axis 18 on the interior wall of section 36 to control the flow of the fluent material to the lower edge 40 and to generate gaps in the fluent material stream for controlled passage of the steam from the annular space and into the lower inlet of the product chamber 31.

Referring to FIG. 2, the upper wall 11 of the vessel 10 is provided with a plurality of openings such as at 44 and 46. The openings 44 are provided to allow visual inspection of the interior of the vessel while the openings 46 are provided in the upper wall and are supplied with installed spray nozzles 48 for cleaning the interior of the product chamber 31 and are of a size to allow venting from the interior of product chamber 31 enclosed within partition wall 30. Such venting allows removal of non-condensable gases and will intensify the counter-flow pattern of fluent material and steam. Control of the internal pressure is maintained in the range of 0.5 to 5 bar depending on the heat treatment being carried out. At the lower end of the cylindrical portion of the vessel 10, there may be provided several cooling water nozzle mountings 50 only one of which is shown. In the upper portion of the vessel 10 radially outside the ring 26, spray nozzle mounts and nozzles as at 51 are provided. The nozzles may be installed with an extension 55 to facilitate cleaning adjacent a inspection sight glass 59. Sight glasses may be installed at selected positions to allow inspection of the operation and to allow a determination when cleaning is required.

Figure 1:
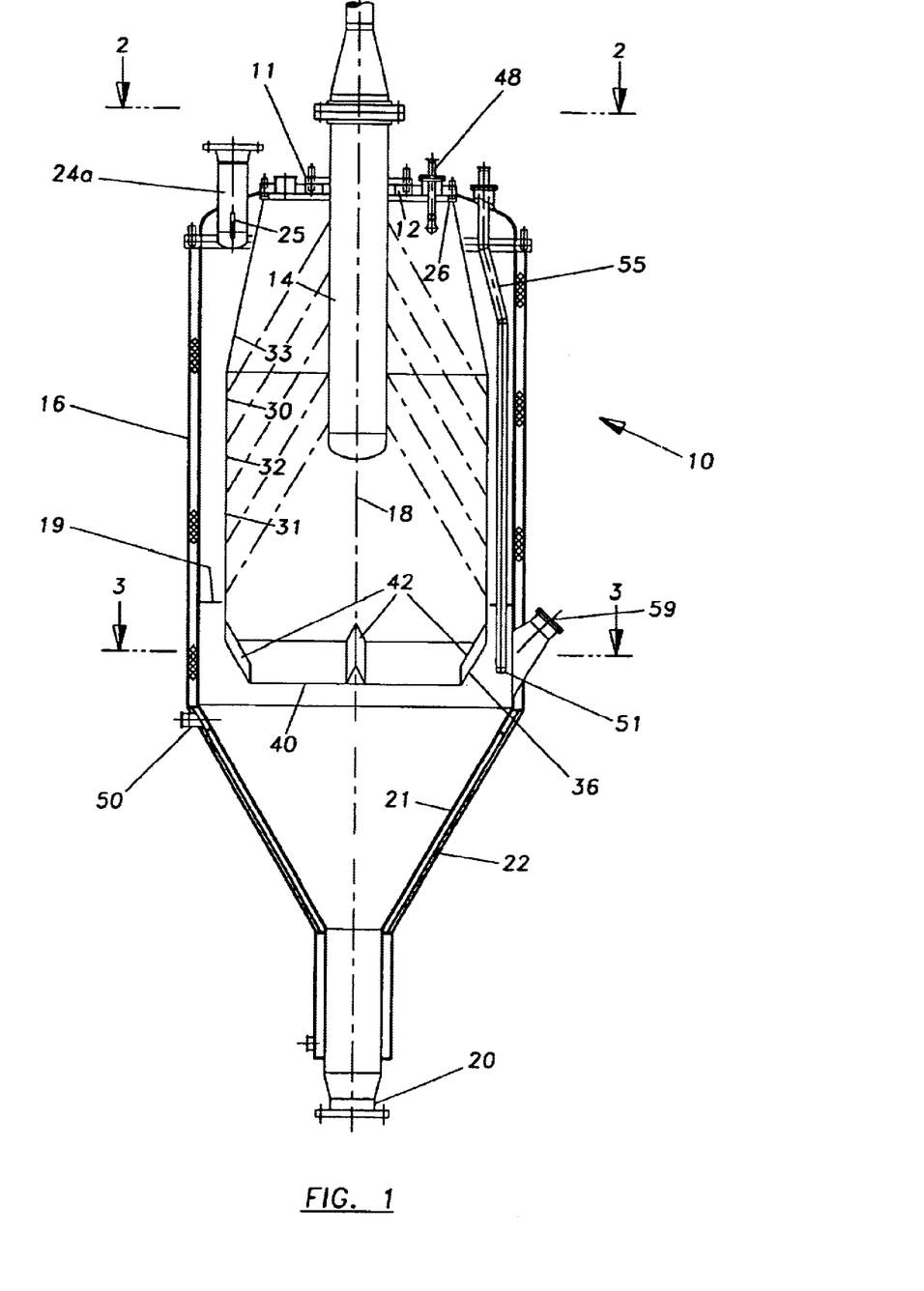
Figure 2:
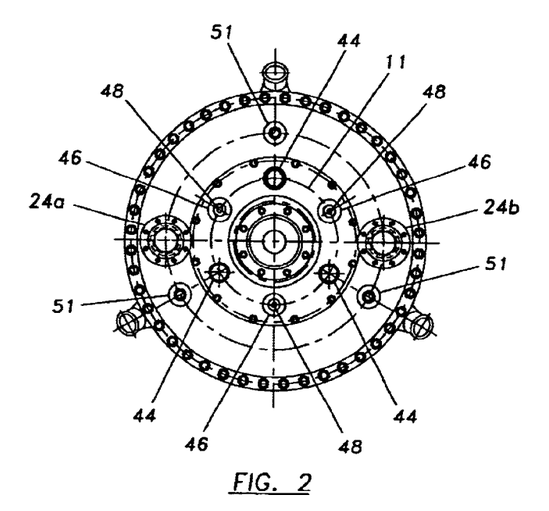
Figure 3:
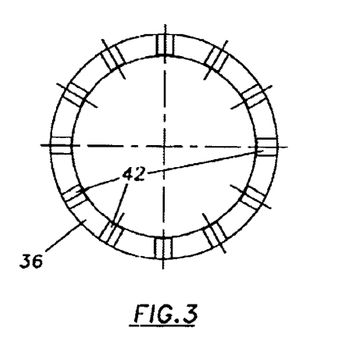
Figure 4:
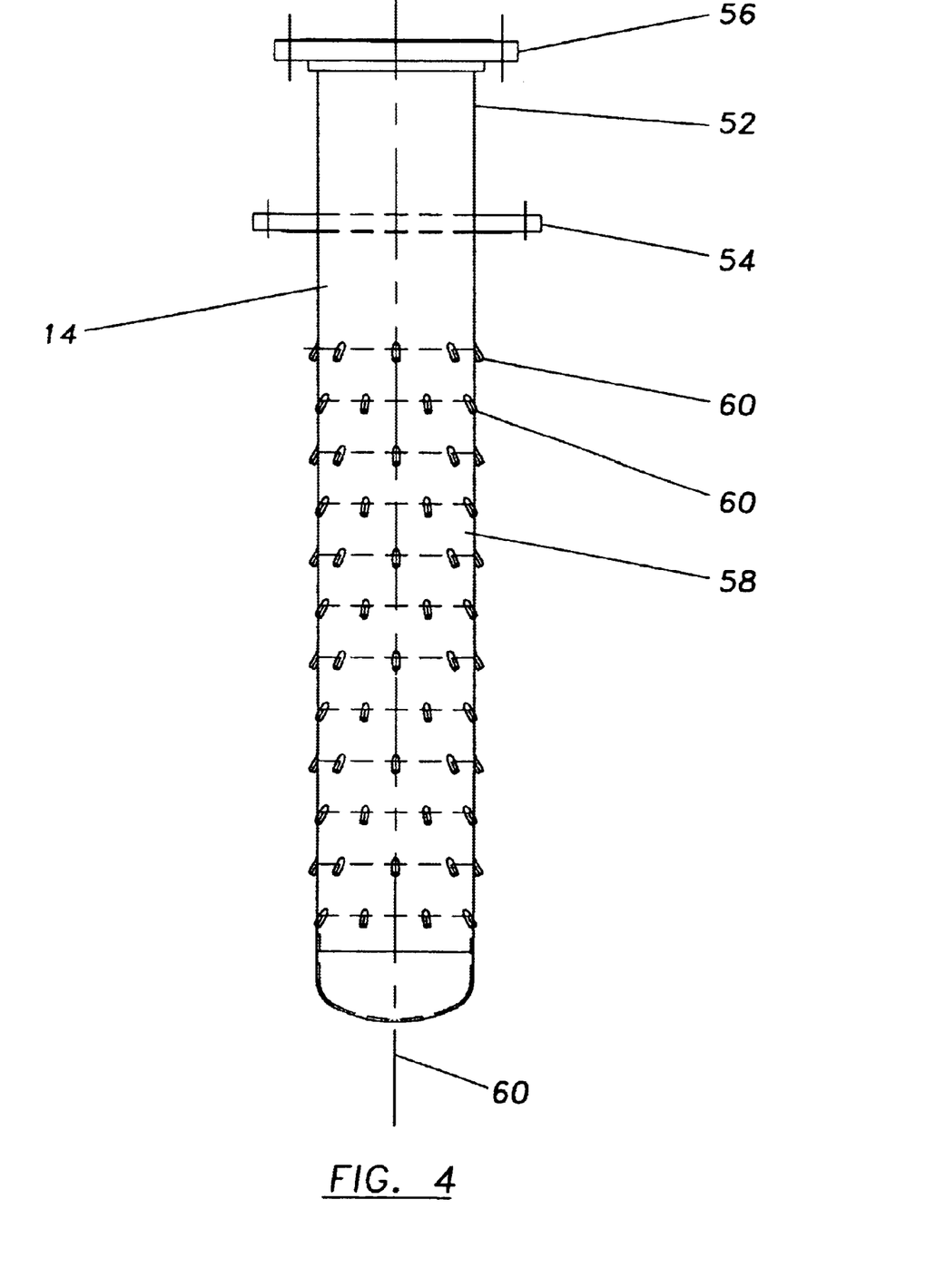

With reference to FIG. 4, an enlarged view of the fluent material distribution device 14 is shown. The device 14 at its upper end is provided with a peripheral lip 56 to which is sealingly attachable a flange 54 which includes a centrally located inlet 52, the upper end of which is open and connectable to a conduit to supply the fluent material such as milk to be treated to the interior of the device 14. The device 14 includes a cylindrical wall 58 which is symmetrical about a longitudinal axis 66 and is formed with a plurality of rows of openings two of which are indicated at 60 with the openings communicating with the hollow interior of the device 14. The opening 12 in the top wall 11 of the vessel 10 and partition wall 30 is located so that the axis 66 of the device 14 will lie on the axis 18 of the vessel 10 and of the partition wall 30. It is important that the openings 60 of one row be offset or staggered relative to the openings of an adjacent row and that a distance of between 25 mm and 75 mm be provided between the rows of openings 60.

Figure 5:
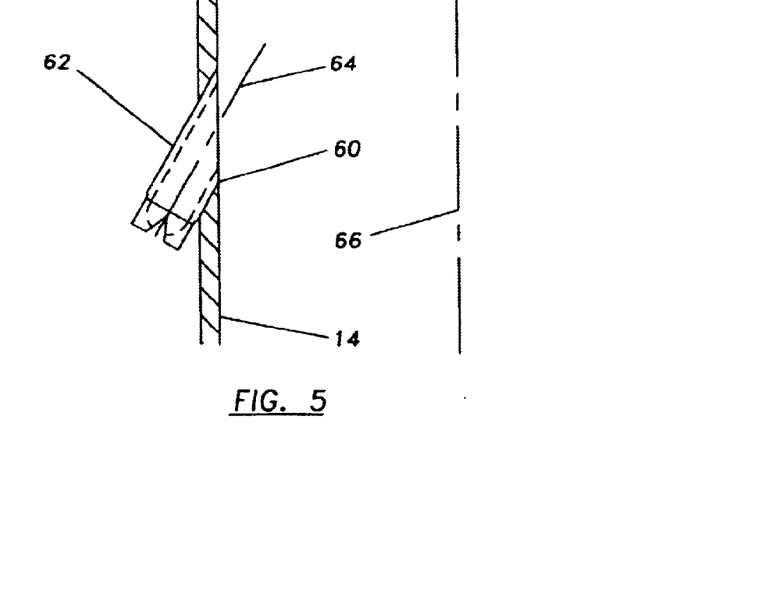
Figure 6:
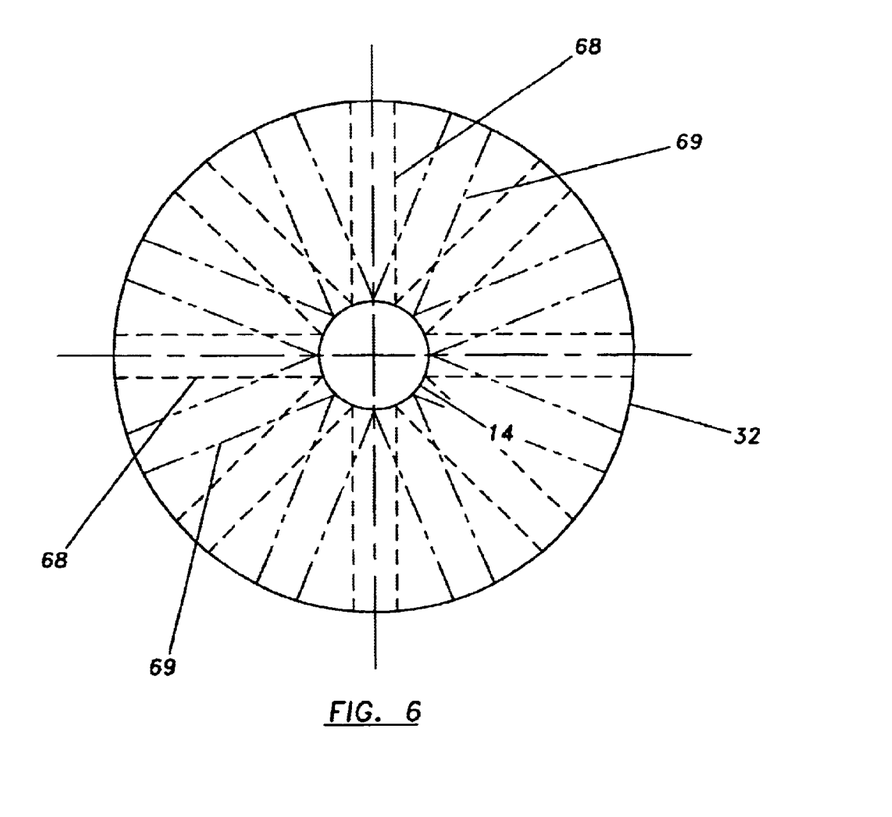

The openings may each be threaded to receive a nozzle 62 of the type having an exterior threaded portion. The nozzles can then be interchanged to provide different flow patterns to accommodate different fluids with differing viscosities and at different flow rates. Alternatively, the nozzles may be inserted with an interference fit or welded in position in each opening. In cases where for sanitary reasons threads are not allowed in the product contact area, the entire device 14 can be inter changed with alternated devices with welded nozzles designed for different products and operating cases. As shown in FIG. 5, each nozzle will be positioned in its associated opening 60 with axis 64 extending at an angle of between 30° and 60° and preferably between 45° and 60° to the axis 66 of the device 14. Thus, since the axis 66 of the device 14 lies on the axis 18 of the vessel 10 and the axis of the product chamber 31, the spray pattern will be projected into the vessel 10 at substantially the same angle provided that sufficient pressure is used. The pressure used should be sufficient to provide a flat, V-shaped spray at high turbulence over the entire distance between the nozzle and the wall of product chamber 31. The angle of the V-spray pattern may vary between 15° and 30°, measured at the nozzle exit. The nozzles are selected so as to provide a well-defined flat spray pattern at a rated fluid pressure and this will, of course, depend on the dimensions of the equipment. By way of example, with an interior diameter of approximately 1000 mm for the partition wall 30 and an external diameter of approximately 200 mm for the device 14, an angular spray pattern 68 as shown in plan view in FIG. 6 may be achieved for each row of nozzles in each opening 60 of the device 14. The pressure should be selected so that the spray pattern 68 from one nozzle will not significantly impinge or interfere with the adjacent spray patterns from adjacent nozzles either in the same row or from rows above or below. As shown in FIG. 6, spaces are provided between the spray patterns thereby forming channels for the rising steam as it travels toward the vents at 46 at the top of the product chamber 31. Only several of the patterns are shown in FIG. 6 for clarity. That is to say, the spray pattern in one row 68 of nozzles (dashes) will be angularly offset from the spray pattern of a vertically adjacent row 69 (dot/dashes) This arrangement affords controlled interaction between the steam and fluent material being treated. Nozzles for effecting this type of pattern are commercially available from a number of sources. Upon impact with the interior surface of wall 32, re-amplified turbulence will result before turbulent flow down the interior surface of the partition wall 30 commences. Since the flow of steam is upwardly. in the volume inside the partition wall, intimate contact with the fluent material will be assured during this segment of the passage of the material. The ratio of steam volume to the liquid volume in the chamber 31 should be maintained in the range of 25–75 to 1. The fluent material passes down from the lower edge 40 of the partition wall 30. The flow of material is broken up by the baffles 42 and a number of these sufficient to allow free passage of the steam into the product chamber 31 without significant deflection of the liquid stream will be provided. At this point, the fluent material has reached the intended final temperature before passing out of the system at 20.

The wall 32 of the partition wall 30 and wall 33 may be thermally isolated from the heat of the incoming steam to avoid liquid burning onto hot spots that may be forming on the interior surface of the product chamber 31. This may be done in a number of ways including insulation layers or a water cooling jacket as is done with the conical portion 21 at 22.

Teflon coatings or other non-stick coatings may be applied to the interior surface of the product chamber 31 to provide additional protection against burn on.

Figure 7:
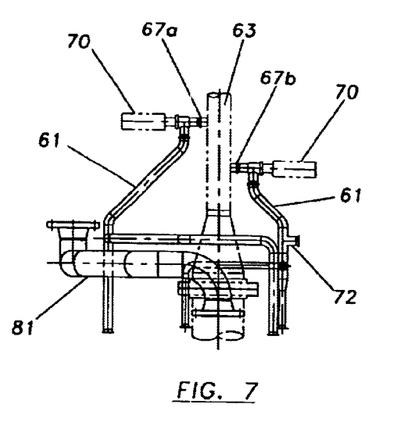

Referring to FIG. 7, there is shown a supply system 61 for a cleaning medium such as water, caustic solutions and acid solutions. In use, a cleaning medium is fed through the supply pipe 63 and enters the system 61 at 67a and 67b by operation of control devices 70. At one or more points of the pipes for system 61, closable vents such as at 72 are provided. During a food handling operation, these vents will be opened to remove non-condensable gases generated during a sterilizing process. During the cleaning process, the vents 72 may be closed intermittently to prevent loss of the cleaning chemicals.

Figure 8:
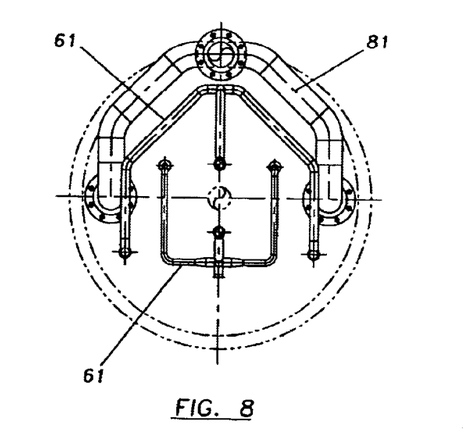

In FIG. 8, the steam supply conduit system 81 is shown for supplying both steam inlets 24a and 24b with steam from a source (not shown).

Figure 9:
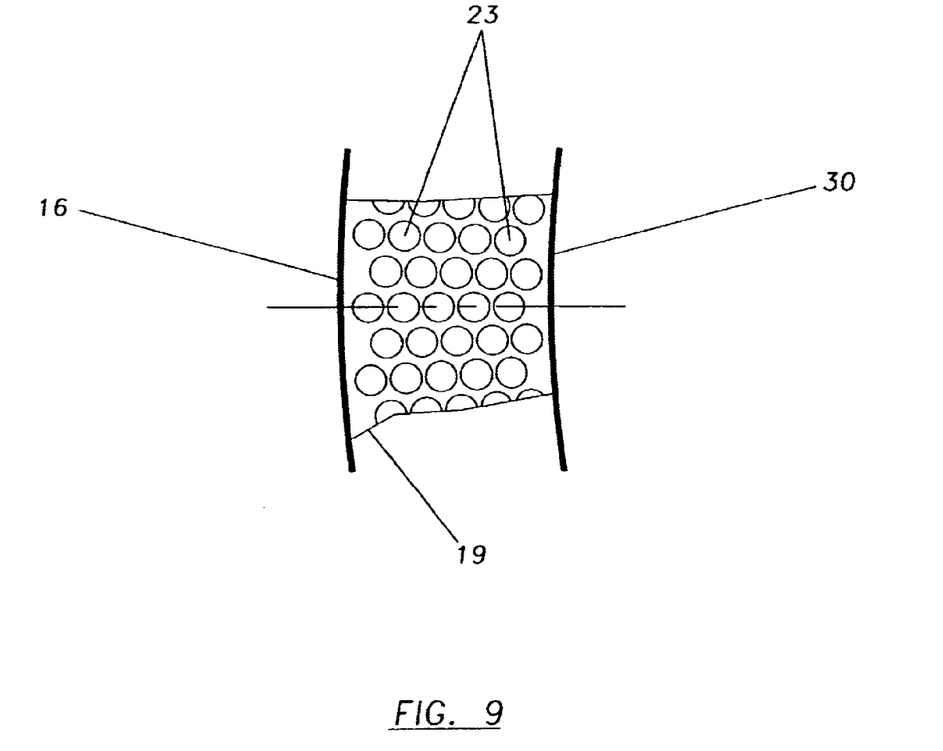

In FIG. 9, there is shown a detailed view of a portion of one of the baffles 19 located between the inner wall of pressure vessel 10 and the outer surface of partition wall 30. The baffle is attached to the inner wall of pressure vessel 10 but just clears the outer surface of the partition wall 30 to allow removal of the partition wall for cleaning and maintenance of the apparatus. Where 2 or 3 baffles 19 are installed, they should be spaced apart along the axis of the vessel 10. As indicated above, the surface of each baffle 19 is perforated as at 23 over substantially its entire surface to better control the flow of steam to the inlet of the product chamber 31. The apertures or perforations 23 may be sited and distributed in a variety of patterns depending on the volume of the vessel and production throughput of steam required. In one form, the size of perforations will decrease in diameter as the distance from the steam inlet increases to create a pressure head above at least some of the baffles.

The invention will allow a process that is well adapted to high heat production of powdered milk at bacterial killing rates comparable to ultra high heat and extended shelf life processes but at holding times in the heating chamber 31 of 30 seconds or less. More significantly, the process of this invention allows the production of a low heat powder with bacterial killing rates comparable to UHT and ESL processes but with holding times of 5 seconds or less and with a longer shelf life for the milk powder. This is achievable by virtue of the capacity of the heater of this invention to handle efficiently larger volumes of the milk product than the prior art devices. In either case, the method of this invention will enable a producer to substantially match the throughput capacity of the evaporators and dryers used in the making of powdered milk using the same sterilizing equipment for both the high and low heat processes. Thus, the capital investment in powdered milk production will be reduced.

Figure 10:
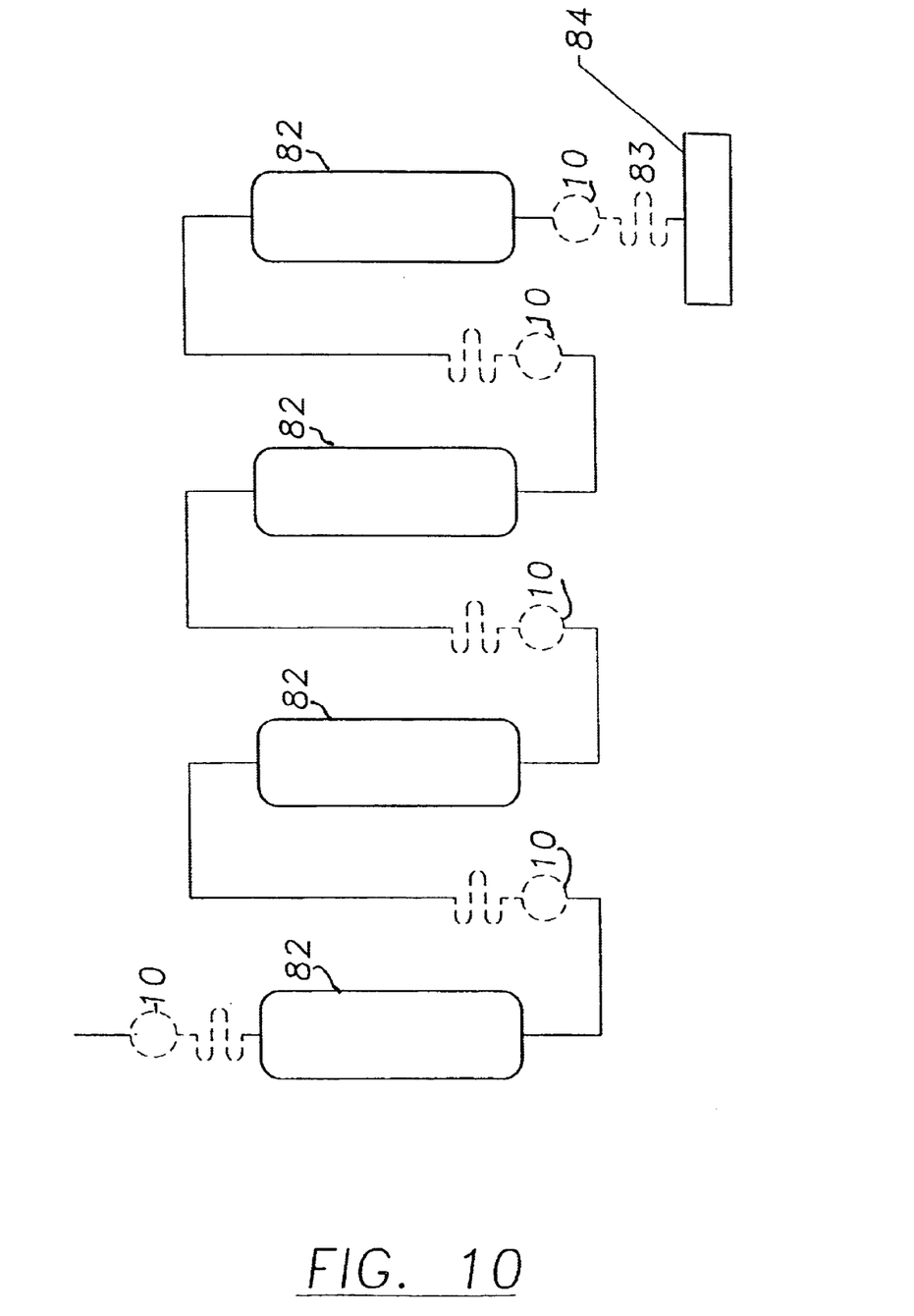

According to the process, as schematically shown in FIG. 10, fresh milk at the rate of approximately 100,000 kg/hr is fed to a set of evaporators of conventional construction. The flow through the sterilizer described above may be interposed at any point along the evaporation path or at the exit end. By regulating the fluid pressure at the source or by intermediate valves or end stage valves, the residence time in the product chamber 31 can be easily achieved and controlled to make efficient use of the evaporator capacities. At end of the evaporation stage, the product, which will have typically started at 9% total solids per unit volume, will now be 50% t/s and the throughput will be approximately 18,000 kg/hr. The product is then passed to a dryer facility and then to packaging or storage. A schematic layout of such a system is shown in FIG. 10 where the vessel 10 is shown in broken lines at a number of the sites where it may be disposed relative to the bank of evaporators devices 82. It will be understood that only one such site need be used. The evaporated product is passed to a dryer 84 and then to storage.

Having described the invention, a number of modifications will become apparent to those skilled in this art and it will be understood that these are within the scope of the appended claims.

What is claimed is:

1. A method for subjecting a fluent food product to heat treatment using a pressure vessel of a type having inlet means adjacent one end of the vessel for a heating medium and a partition wall having an interior defining a treatment zone having a fluent food product distribution device attached to an inlet for the food product adjacent the one end of the vessel, the treatment zone having an open end located in spaced relation to the inlet means and a space provided between the interior wall of the vessel and the exterior wall of the partition wall, comprising the steps of: a) introducing the heating medium into the vessel at a point outside the partition wall, b) venting at least a portion of the heating medium from one end of the vessel through the treatment zone so as to establish a flow direction for the heating medium in the treatment zone from the open end toward the one end of the vessel, c) introducing the fluent food product from the distribution device in the form of a plurality of substantially discrete flat sprays directed at the interior of the partition wall with a pressure sufficient to cause the sprays to impact against the interior of the partition wall while still turbulent.

2. The method as claimed in claim 1 including the step of directing the sprays at an acute angle to the interior wall of the treatment chamber.

3. The method as claimed in claim 2 wherein said acute angle is in the range of 45 degrees and 60 degrees.

4. The method as claimed in claim 1 including the step of providing spaces between the sprays to allow the heating medium to pass through the spaces so provided.

5. The method as claimed in claim 1 including the step of venting the heating medium and any non-condensable gases from the one end of the vessel and treatment zone.

6. The method as claimed in claim 1 wherein the heating medium is steam.

7. The method as claimed in claim 1 wherein the fluent food product is milk.

8. A method of producing a powdered milk product from fresh milk comprising the steps of feeding the fresh milk to an evaporator having one or more stages and either before or after at least one evaporator stage, subjecting the milk to heat treatment using a pressure vessel of a type having inlet means adjacent one end of the vessel for a heating medium and a partition wall having an interior defining a treatment zone having a fresh milk distribution device attached to an inlet for the fresh milk adjacent the one end of the vessel, the treatment zone having an open end located in spaced relation to the inlet means and a space provided between the interior wall of the vessel and the exterior wall of the partition wall, and introducing the heating medium into the vessel at a point outside the partition wall, venting at least a portion of the heating medium from one end of the vessel through the treatment zone so as to establish a flow direction for the heating medium in the treatment zone from the open end toward the one end of the vessel, introducing the fresh milk from the distribution device in the form of a plurality of substantially discrete flat sprays directed at the interior of the partition wall with a pressure sufficient to cause the sprays to impact against the interior of the partition wall while still turbulent, removing the milk product from the vessel and passing the product to a dryer to produce a powdered milk product.

9. The method as claimed in claim 8 including the step of maintaining the milk in holding tubes between 2 seconds and 30 seconds.

10. The method as claimed in claim 9 wherein the step of maintaining the milk in holding tubes is for approximately 5 seconds.

11. The method as claimed in claim 8 including the step of using a plurality of evaporator stages and selecting a site among the stages, including before a first one and after the last one of the stages and positioning the vessel to receive milk product at that site and after heat treatment, passing the milk product to a subsequent stage.

* * * * *